United States Patent
Mathen et al.

(10) Patent No.: US 10,949,329 B2
(45) Date of Patent: Mar. 16, 2021

(54) MACHINE DEFECT PREDICTION BASED ON A SIGNATURE

(71) Applicant: Oracle International Corporation, Redwood Shores, CA (US)

(72) Inventors: Manoj Mathen, Trivandrum (IN); Raghothama Vijendran, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 160 days.

(21) Appl. No.: 16/232,316

(22) Filed: Dec. 26, 2018

(65) Prior Publication Data

US 2019/0196938 A1 Jun. 27, 2019

(30) Foreign Application Priority Data

Dec. 26, 2017 (IN) .............................. 201741046563

(51) Int. Cl.
| | | |
|---|---|---|
| *G06F 11/00* | (2006.01) | |
| *G06F 11/36* | (2006.01) | |
| *G06K 9/62* | (2006.01) | |
| *G06N 20/00* | (2019.01) | |
| *G06K 9/00* | (2006.01) | |

(52) U.S. Cl.
CPC ........ *G06F 11/3616* (2013.01); *G06F 11/366* (2013.01); *G06K 9/00496* (2013.01); *G06K 9/6297* (2013.01); *G06N 20/00* (2019.01)

(58) Field of Classification Search
CPC .............................. G06F 11/366; G06N 20/00
See application file for complete search history.

(56) References Cited

U.S. PATENT DOCUMENTS

| | | | |
|---|---|---|---|
| 7,614,043 B2 | 11/2009 | Ognev et al. | |
| 9,262,255 B2* | 2/2016 | Hampapur | .......... G06F 11/0709 |
| 9,519,477 B2 | 12/2016 | Champlin-Scharff et al. | |
| 9,582,408 B1 | 2/2017 | Jayaraman et al. | |
| 2014/0053135 A1* | 2/2014 | Bird | ......................... G06F 8/71 |
| | | | 717/124 |

(Continued)

OTHER PUBLICATIONS

Author Unknown, "Artificial intelligence/ Machine learning led QA", retrieved from https://www.infosys.com/IT-services/validation-solutions/service-offerings/Pages/machine-learning-qa.aspx on Apr. 25, 2017.

(Continued)

*Primary Examiner* — Jonathan D Gibson
(74) *Attorney, Agent, or Firm* — Potomac Law Group, PLLC

(57) ABSTRACT

Methods, system, and computer readable medium are presented for predicting defects using a machine learning component based on a generated signature. A trained machine learning component that has been trained with historic data that represents a series of events that occurred within a plurality of heterogeneous systems over a plurality of periods of change for the heterogeneous systems can be received. A base signature for a first heterogeneous system that includes a first mix of modules can be compared to a current signature for the first heterogeneous system to identify one or more irregularities. The trained machine learning component can predict one or more defects for the first heterogeneous system based on the identified irregularity.

20 Claims, 15 Drawing Sheets

(56) References Cited

U.S. PATENT DOCUMENTS

| | | | |
|---|---|---|---|
| 2015/0033202 A1* | 1/2015 | Wilson | G06F 8/43 |
| | | | 717/106 |
| 2017/0192880 A1* | 7/2017 | Ramakrishnan | G06F 11/3672 |
| 2018/0183660 A1* | 6/2018 | Byers | H04L 41/147 |
| 2018/0307582 A1* | 10/2018 | Vikjord | G06F 11/362 |
| 2019/0095313 A1* | 3/2019 | Xu | G06K 9/6282 |
| 2019/0196938 A1* | 6/2019 | Mathen | G06F 11/366 |
| 2019/0347188 A1* | 11/2019 | Sobran | G06F 11/366 |

OTHER PUBLICATIONS

Author Unknown, "Making a Quantum Leap with Continuous Analytics-Based QA", cognizant 20-20 insights, Jun. 2016.

Dominique Raviart, "Infosys Applying AI to Test Automation", Posted Jun. 3, 2016 and retrieved from https://research.nelson-hall.com/blog/?avpage-views=blog&type=post&post_id=531 on Sep. 8, 2017.

Saravanan Palanivelu, "4 Ways Machine Learning is Improving Software Testing", Published Jul. 25, 2017, Retrieved from https://www.linkedin.com/pulse/4-ways-machine-learning-improving-software-testing-palanivelu on Sep. 8, 2017.

Shamim Ahmed, "Intelligent Quality Automation: transforming QA automation using the power of Autonomics", Published on Jun. 1, 2016. Retrieved from https://www.linkedin.com/pulse/intelligent-quality-automation-transforming-qa-using-power-ahmed on Sep. 8, 2017.

\* cited by examiner

| S.No | TASK_NAME | ATTEMPT | STAGE_NAME | STATUS | START_TIME | END_TIME | TIME_TAKEN | ERRORS | ORA_ERRORS | FAILURES |
|---|---|---|---|---|---|---|---|---|---|---|
| 1 | Configuring Patch Manager | 0 | skipped | NA | NA | NA | | | | |
| 2 | Updating Patch Manager and Dependent Components | 1 | LCM | success | Wed Dec 5 12:30:34 UTC 2018 | Wed Dec 5 12:30:39 UTC 2018 | 0 hours 0 min 5 sec 137 msec | 0 | 0 | 1 |
| 3 | Reconfiguring Patch Manager | 1 | LCM | success | Wed Dec 5 12:30:39 UTC 2018 | Wed Dec 5 12:30:41 UTC 2018 | 0 hours 0 min 1 sec 819 msec | 0 | 0 | 0 |
| 4 | Bootstrapping Patch Manager | 1 | LCM | success | Wed Dec 5 12:30:41 UTC 2018 | Wed Dec 5 12:34:33 UTC 2018 | 0 hours 3 min 52 sec 228 msec | 0 | 0 | 0 |
| 5 | Creating LCM Administration Schemas | 1 | LCM | success | Wed Dec 5 12:34:33 UTC 2018 | Wed Dec 5 12:36:06 UTC 2018 | 0 hours 1 min 32 sec 794 msec | 0 | 0 | 0 |
| 6 | Upgrading LCM Administration Schemas | 1 | LCM | success | Wed Dec 5 12:36:06 UTC 2018 | Wed Dec 5 12:36:31 UTC 2018 | 0 hours 0 min 25 sec 125 msec | 0 | 0 | 0 |

MACHINE DEFECT PREDICTION BASED ON A SIGNATURE

FIELD

The embodiments of the present disclosure generally relate to predicting defects by a machine learning component based on a generated signature.

BACKGROUND

Modern software applications have grown into robust offerings that provide dynamic service. Enterprise level software applications often include numerous and different components working together to achieve sophisticated functionality. In such an environment, various moving parts can generate layers of complexity that result in sub-optimal performance. For example, when an update is pushed to a sub-component of a software module that is part of a larger software service offering, unanticipated effects can be experienced at various levels of the service. In another example, when the context for a given software module changes, such as when the module is operating in a new environment, with new use cases, and the like, the given module itself can experience sub-optimal performance or defects, and other modules that work in tandem with the given module can similarly experience these issues. Thus, while modern software can achieve remarkable functionality, the leveled structure can be cumbersome in certain circumstances. A software tool that can predict how software modules will perform in the context of a potential or current change can therefore improve the functionality, reliability, and extensibility of modern software.

SUMMARY

The embodiments of the present disclosure are generally directed to systems and methods for predicting defects by a machine learning component based on a generated signature that substantially improve upon the related art. A trained machine learning component can be received that has been trained with historic data that represents a series of events that occurred within a plurality of heterogeneous systems over a plurality of periods of change for the heterogeneous systems, wherein the heterogeneous systems include different mixes of modules. A base signature for a first heterogeneous system that includes a first mix of modules can be compared to a current signature for the first heterogeneous system to identify one or more irregularities, wherein the base signature represents a series of events that occurred within a subset of the plurality of heterogeneous systems over a plurality of periods of change and the current signature represents a runtime series of events that occur within the first heterogeneous system. The trained machine learning component can predict one or more defects for the first heterogeneous system based on the identified one or more irregularities.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIGS. 6A and 6B illustrate representations of signatures according to an example embodiment.

DETAILED DESCRIPTION

Figure 1:
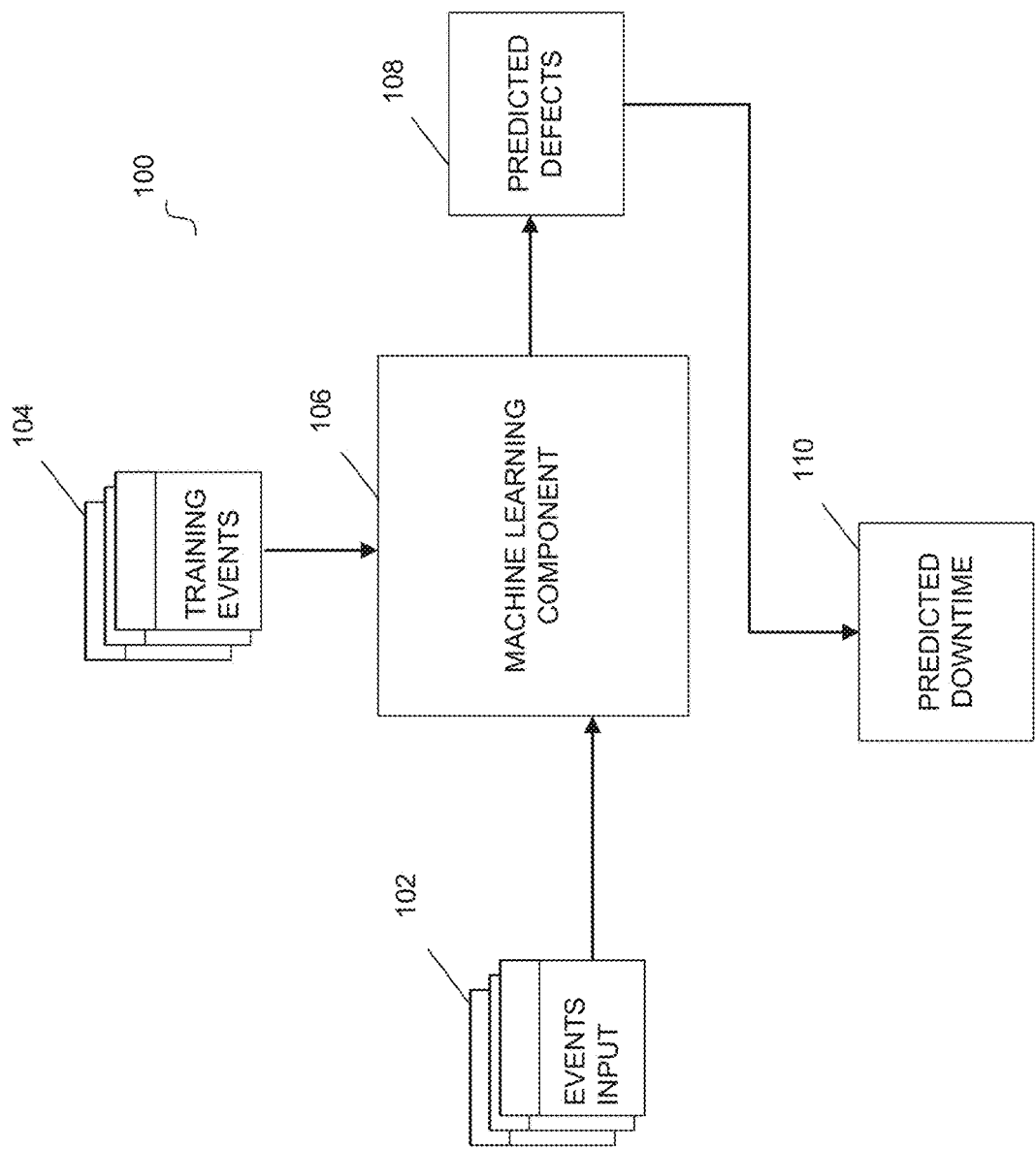
FIG. 1 illustrates a system for predicting defects by a machine learning component based on a generated signature according to an example embodiment.

Embodiments predict defects using a machine learning component based on a generated signature, for example in a hyperscale, distributed cloud computing environment. A heterogeneous system can be a computing system with a plurality of different modules or components working together, such as an enterprise software system that leverages different types of cloud services, application services, database services, and the like. In some implementations, these modules or components can be sourced from different product and service vendors and/or developed and built by different development teams. In such an environment, changes to one module or component can impact other parts of the system. For example, when a module or component of the system is updated or patched, the remaining system modules or components can be affected since the different parts of the heterogeneous system work together to achieve the enterprise functionality.

In some embodiments, a service provider, such as a cloud service provider, database service producer, or other software as a service provider, can implement mitigation techniques to predict the impact that a change can have on a heterogeneous system. For example, when the service provider pushes a patch or update, the service provider can often impact several clients, such as hundreds or thousands, at any given time. These customers can have a variety of different configurations that implement their enterprise systems, such as different software service providers, versions of service/software, hardware, and the like. Embodiments implement various techniques to predict defects within configurations of heterogeneous enterprise systems when a change is made to a module or component of the system, such as when an update or patch is pushed.

In some embodiments, a base signature can be generated based on changes made to a module of a given enterprise software system over time. For example, for a given configuration of an enterprise system, a first module may be updated or patched several times, and the impact of these updates or patches can be used to generate a base signature that represents how the system behaves when the first module is updated or patched. In some embodiments, log files are processed and sequenced to generate the base signature.

Once the base signature is generated, it can be compared to the system behavior during subsequent changes, such as subsequent updates or patches. For example, when a patch or update begins, the log files that represent the system behavior can be used to generate a current signature. Similar to the base signature, the log files can be processed and sequenced to generate the current signature. The current signature can be compared to a corresponding part of the base signature to determine if system behavior matches the past. For example, natural language processing techniques can be used to identify discrepancies. When the comparison yields deviations, irregularities can be identified.

In some embodiments, a trained machine learning component can correlate these irregularities to predict defects downstream. For example, a machine learning component can be trained with the heterogeneous system behavior over past patches or updates (e.g., the processed and sequenced log files). The trained machine learning component can then identify patterns where an irregularity generates a defect downstream. For example, the historic data can show that in some configurations of heterogeneous enterprise systems, a first irregularity caused by patching or updating a first module can generate a first defect in a second module, while in other configuration of heterogeneous enterprise systems the first irregularity caused by updating or patching the first module can generate a second defect in a third module. Thus, the irregularities can be correlated to predict defects that are specific to the configuration of the heterogeneous enterprise systems. Embodiments can also use the predicted defects to predict a downtime for a heterogeneous enterprise system while the change is being implemented, such as downtime for the system while a module is being patched or updated.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for predicting defects using a machine learning component based on a generated signature according to an embodiment. System 100 includes events input 102, training events 104, machine learning component 106, predicted defects 108, and predicted downtime 110. For example, a heterogeneous enterprise system may be experiencing a change to one of its modules, such as a patch or update, and various components of system 100 can be used to predict defects based on the change. Events input 102 can be the events that are performed to implement the change, such as the events of a software patch or update to a module. For example, events input 102 can be the runtime logs of the different modules or components of the heterogeneous enterprise system while the events of the patch or update are being performed (e.g., current signature). In an embodiment, events input 102 can represent the initial portion or starting portion of the change (e.g., update or patch). In other embodiments, events input 102 can represent a larger portion (or all) of the update or patch.

In some embodiments, training events 104 can represent heterogeneous enterprise systems' behavior when implementing previous changes, such as when previous updates or patches were performed. For example, training events 104 can be the logs of the different modules or components for heterogeneous enterprise systems' while the events of previous patches or updates were performed.

In some embodiments, events input 102 can be processed prior to being input to machine learning component 106 to identify discrepancies. For example, a base signature can be generated for the specific heterogeneous enterprise system that represents how the system has behaved when previous updates or patches have been performed for the module. A comparison between the current signature and the corresponding portion of the base signature (e.g., corresponding relative to temporality and functionality) can yield irregularities. In other words, the behavior of the system when implementing the current patch or update may be different from the historic behavior, and this irregularity can be identified. For example, this implementation can include self-learning and/or self-healing functionality. In some embodiments, irregularities can be defects. For example, a generated log can include a word that indicates a defect, such as "error", and this defect can be identified based on the log itself.

Machine learning component 106 can then correlate the irregularities/defects to predict defects in other modules or components of the heterogeneous enterprise system. For example, training events 104 can include patterns or trends, where a given irregularity in a first module leads to a defect in a second module for a given configuration of a heterogeneous enterprise system. In other words, an irregularity appearing in a certain configuration during a change (e.g., performance of a patch or update) can be correlated to a defect, such as an irregularity appearing in a first module being correlated to a defect that will later appear in a second module, based on the historic patterns (e.g., patterns present in the training events 104). Accordingly, based on one or more irregularities identified by the comparison of signatures (e.g., current compared to base) and the patterns or trends learned by machine learning component 106, one or more defects can be predicted according to the discovered correlations.

In an embodiment, the predicted defects can be used to predict a downtime for the heterogeneous enterprise system. For example, the downtime can refer to the downtime for the heterogeneous system while a patch or update to a module is implemented.

Figure 2:
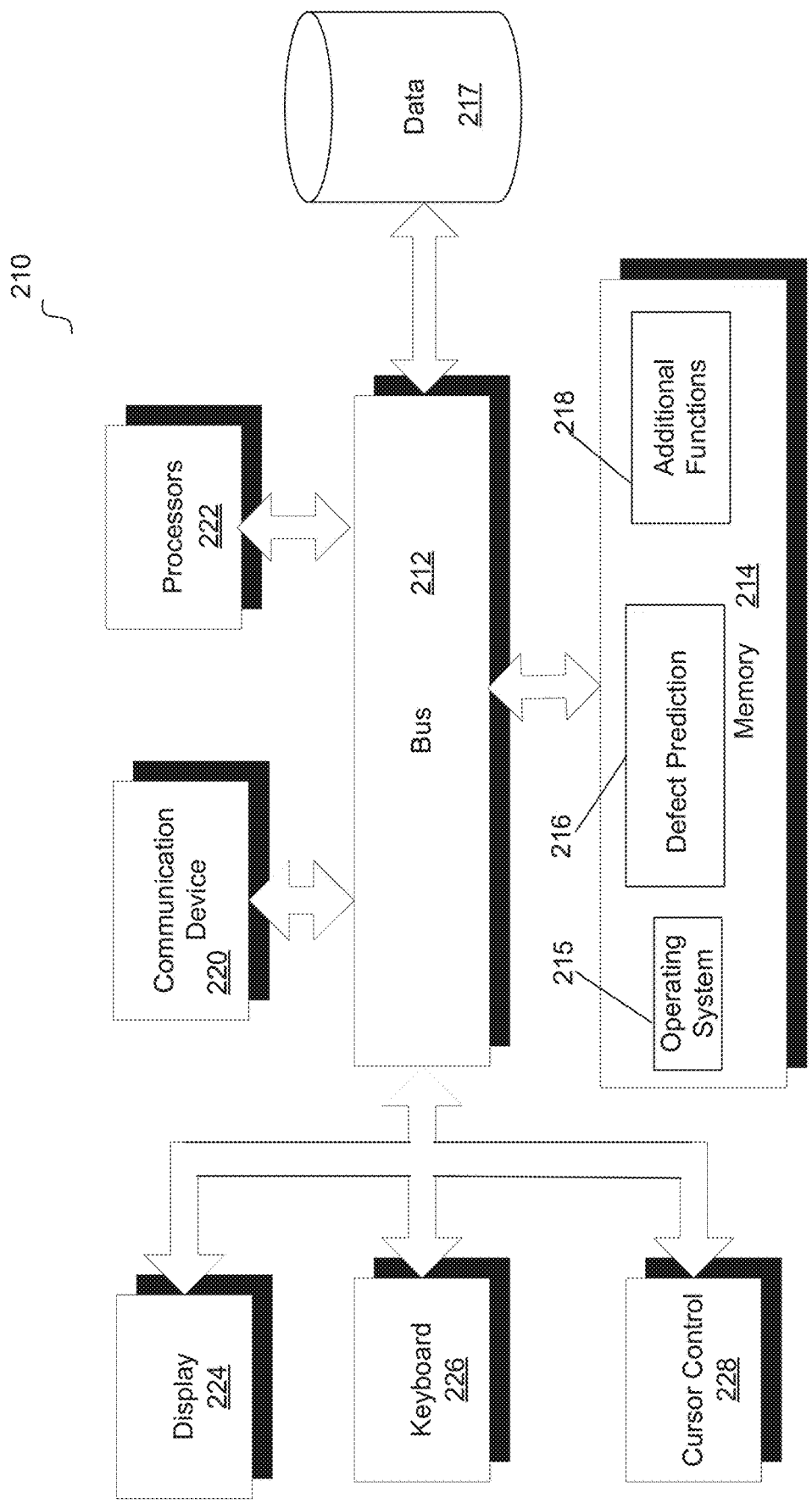
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, defect prediction component 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, defect prediction component 216, as well as other applications modules 218. Operating system 215 provides operating system functionality for system 210. Defect prediction component 216 may provide system functionality for predicting defects for a heterogeneous enterprise system undergoing change, or may further provide any other functionality of this disclosure. In some instances, defect prediction component 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various module of Oracle® Cloud or, for example Oracle® Management Cloud, log harvester modules, call center modules, sales management modules, and the like. A database 217 is coupled to bus 212 to provide centralized storage for modules 216 and 218 and to store, for example, wireless device activity, and in some embodiments, user profiles, transactions history, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Modern day software releases are often dependent on a testing cycle, and in the case of Agile/Devops projects, there is little time available for testing. The disclosed techniques leverage a machine learning component, big data, and modern techniques like pattern recognition and natural language processing to scan through very large logs (e.g., millions of lines of server logs), identify irregularities/defects and/or new patterns, and thus detect potential defects that may impact the software release.

In some embodiments, a non-intrusive layer of automation scans log event to detect patterns. Patterns can be overlaid onto a host type to create signatures (e.g., temporal and functional). This can further facilitate predicting downstream events within a product/application, and thus ensures that defects are not slipped in a testing phase.

With regard to conventional approaches, traditional software validation techniques can depend on predefined test cases and scenarios, and thus, they are as good as the scenarios. The disclosed techniques identify additional possible use case scenarios of a particular system from the log files, thus ensuring that frequently occurring scenarios are not missed during the validation phase. For example, the platform leverages self-learning techniques which allow for new patterns/correlations of defects to be discovered. In traditional software testing approaches, the results are only as good as the test scenarios and test cases. The proposed embodiments address this drawback by increasing the test coverage drastically.

A modern software product is often maintained continuously and enhancements/bug fixes are pushed to ensure the product remains in a healthy state. Validation of these enhancements helps ensure that software stays operational and reduces downtime. Embodiments parse through historic log files to identify potential work flows and helps detect irregularities/defects. For example, embodiments can include a python based engine that parses up/downstream log files, identifies irregularities/patterns, and achieves defect prediction.

Some embodiments can identify new events/irregularities/defects within the software system, even before a black box tester identifies these. For example, the prediction engine can predict downstream events based on the upstream events. The platform can also provide trends on the overall health of the underlying system. The system also facilitates defect localization, which can help reduce software testing cycle times drastically, resulting in significant cost and effort savings.

Figure 3A:
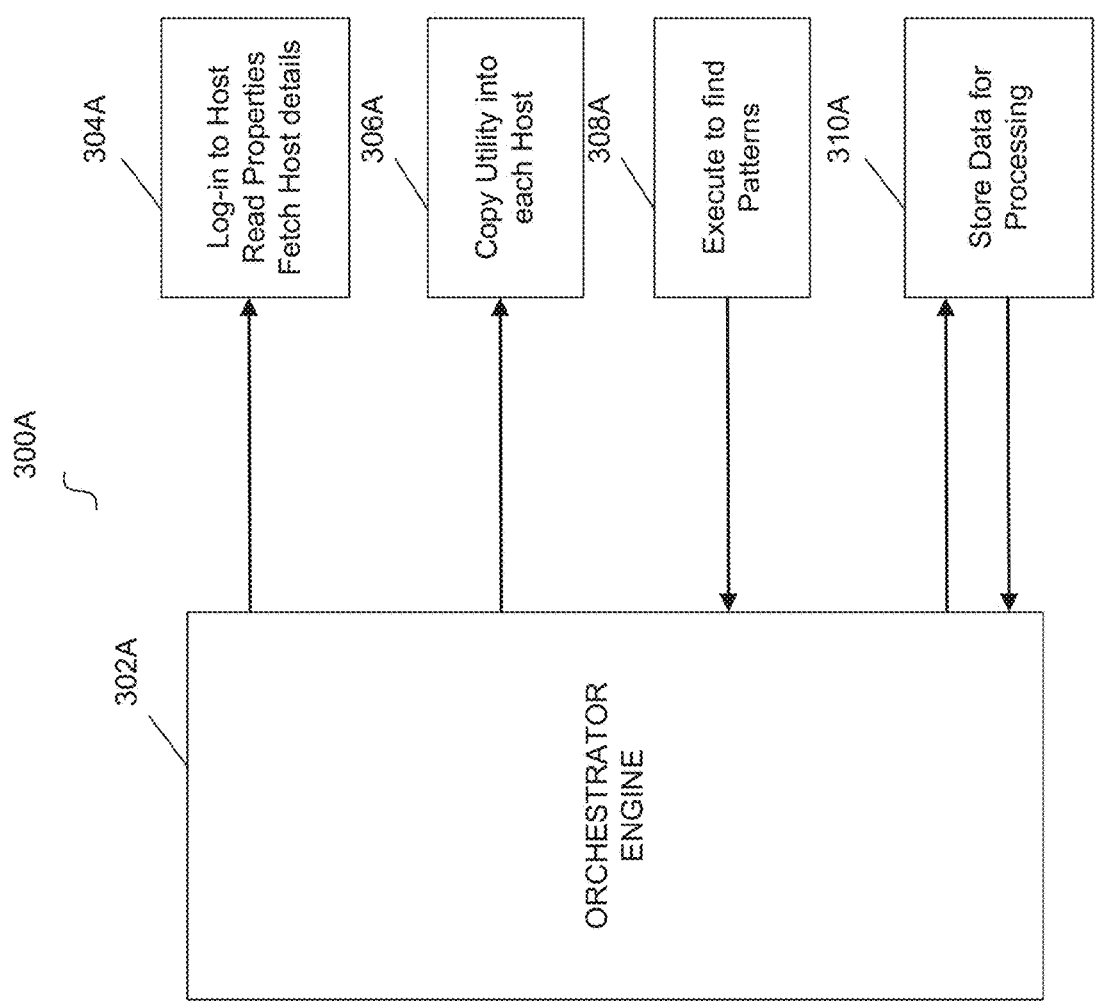
FIGS. 3A and 3B illustrate orchestration systems for predicting defects by a machine learning component based on a generated signature according to an example embodiment.
Figure 3B:
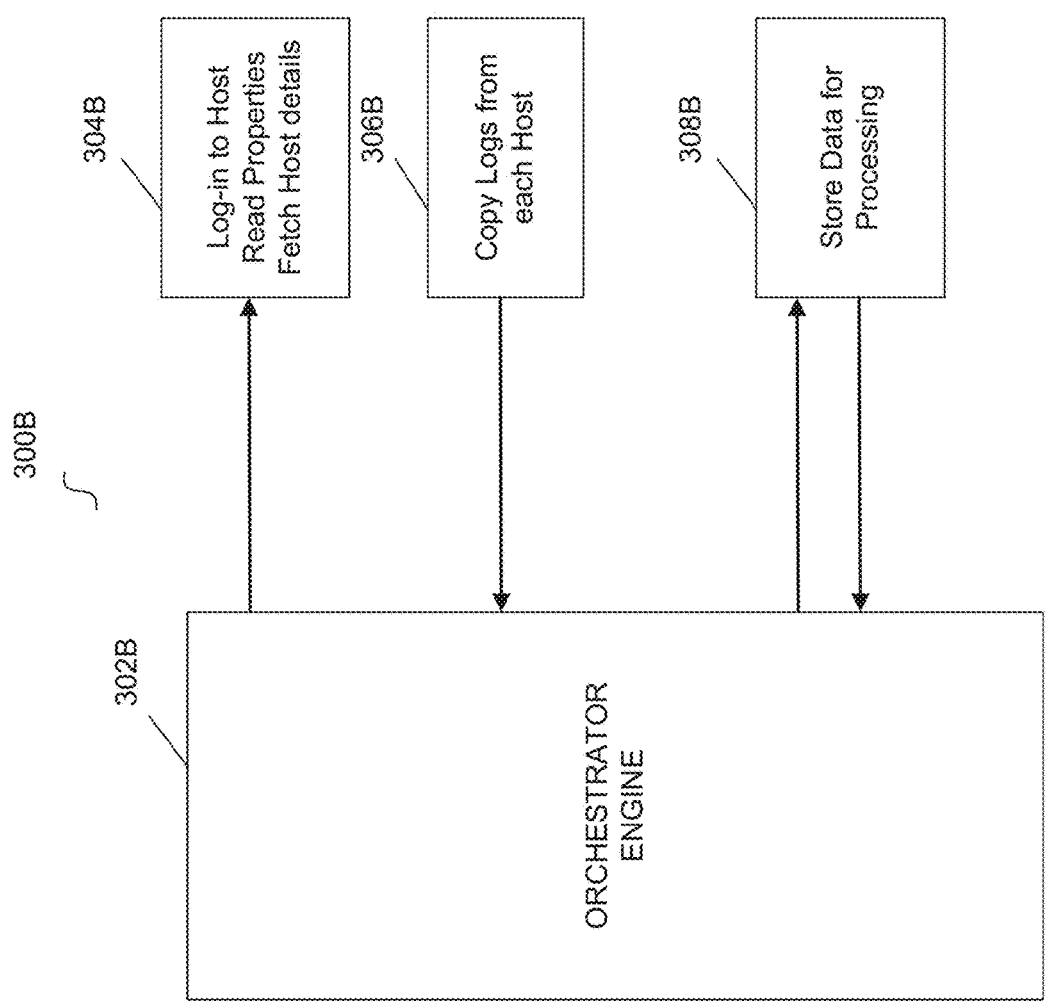

FIGS. 3A-3B illustrate orchestration systems for predicting defects by a machine learning component based on a generated signature according to an example embodiment.

System 300A can include orchestrator engine 302A, which can control the overall flow. At 304A, a user can provide credentials to log into one or more source servers, and the orchestrator engine 302A can obtain inputs and host details, for example log paths/locations, and the like. At 306A, orchestrator engine 302A can copy a utility, such as a software utility, onto the one or more hosts and then execute a parser. At 308A, new patterns are identified and recorded, such as patterns between irregularities and/or defects. A correlation module within orchestrator engine 302A can correlate the disparate events. At 310A, new patterns, error or defects counts, and the like can be recorded in a database for trend analysis.

System 300B can include orchestrator engine 302B, which can operate during changes to the host systems, such as a software patch or upgrade. At 304B, orchestrator engine 302B logs into the one or more host machines. At 306B, orchestrator engine 302B reads relevant artifacts, copies the logs offline, and processes them. For example, Natural Language Processing (NLP) algorithms can be leveraged for pattern identification (e.g., identification of irregularities or defects). At 308B, new patterns and/or defects can be stored in a database for further processing.

Embodiments leverage a base signature in order to identify irregularities during change to a heterogeneous enterprise system. For example, log records over previous changes can be compared to log records being generated during a new change to identify irregular behavior. In some embodiments, the base signature is generated from several runs of the particular life cycle management ("LCM") activity (e.g., the change activity). For example, the logs can be extracted from several successful runs, sequencing them (if the logs are from different hosts), and then extracting the log signature from the real logs. Log signature extraction can be implemented using techniques like tokenization, stemming, and regular expressions. The base signature can be a systemic representation of the activities involved with implemented a change and their sequence.

Figure 4:
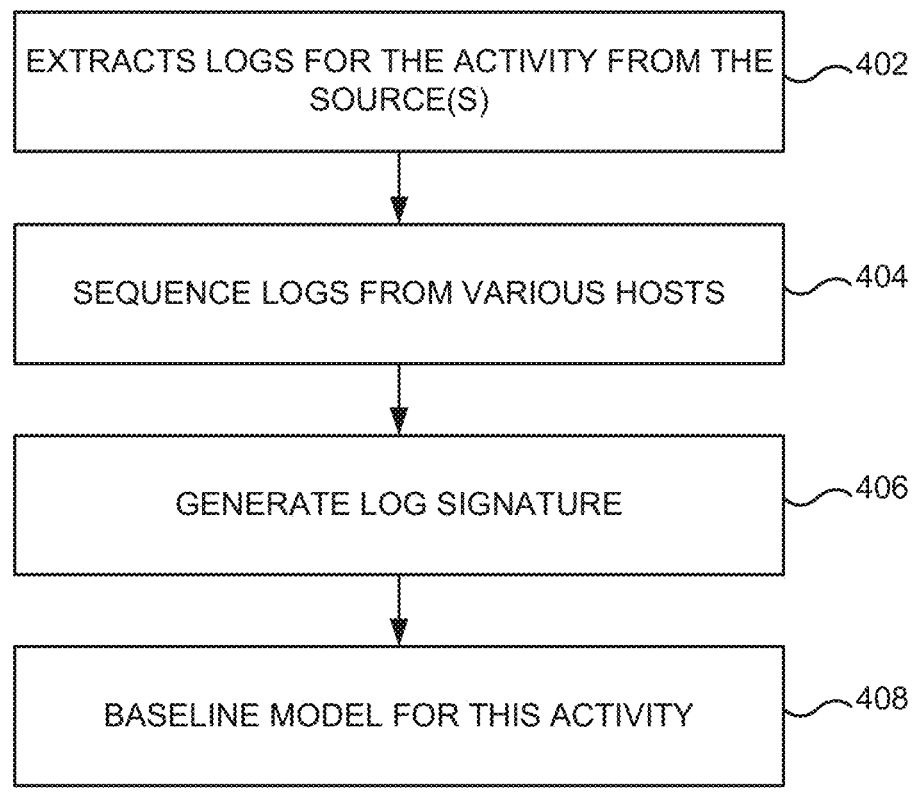
FIG. 4 illustrates a flow diagram for generating a base signature according to an example embodiment.

FIG. 4 illustrates a flow diagram for generating a base signature according to an example embodiment. In one embodiment, the functionality of FIGS. 4-9 and 12 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 402, logs for a particular activity can be extracted, for example from the hosts of the heterogeneous enterprise systems. As disclosed herein, hosts can be logged into to retrieve log files generated during implementation of a change, such as log files generated while an update or patch is pushed. For example, a change for a first heterogeneous enterprise system that includes a first mix of modules or components can be implemented, such as an update or patch being pushed by a service provider. The log file from the various hosts that make up heterogeneous systems can be retrieved, and these log files can represent the systems' behavior over the change implementation. An example log file is provided below that can be generated by computing devices while implementing a change, such as a patch or update:

```
[2017-06-11T13:23:09.599+00:00] [main] [NOTIFICATION] [ ] [oracle.ruplite] [tid: 1] [ecid:
0000LmNKd0w7Y7Oplgs1yf1PFKGx000001,0] Command-line args received: ['-m',
'flo.plugin.SetEMBlackout', 'EM.SET_BLACKOUT_MAIL_DOWN_20170611050000_20170617000000', '-i',
'/fsnadmin/upgrade/M6D2.2/FLO_HOME/metadata/SDIQA38300234-TEST-MC/slcab85axvm36']
[2017-06-11T13:23:09.600+00:00] [main] [NOTIFICATION] [ ] [oracle.ruplite] [tid: 1] [ecid:
0000LmNKd0w7Y7Oplgs1yf1PFKGx000001,0] Running modules: flo.plugin.SetEMBlackout
[2017-06-11T13:23:09.600+00:00] [main] [NOTIFICATION] [ ] [oracle.ruplite] [tid: 1] [ecid:
0000LmNKd0w7Y7Oplgs1yf1PFKGx000001,0] Env properties input dir:
/fsnadmin/upgrade/M6D2.2/FLO_HOME/metadata/SDIQA38300234-TEST-MC/slcab85axvm36
[2017-06-11T13:23:09.601+00:00] [main] [NOTIFICATION] [ ] [oracle.ruplite] [tid: 1] [ecid:
0000LmNKd0w7Y7Oplgs1yf1PFKGx000001,0] Log file name:
/u01/APPLTOP/instance/lcm/logs/rupliteflo/EM.SET_BLACKOUT_MAIL_DOWN_20170611050000_20170
617000000/slcab85axvm36.us.oracle.com//flo.plugin.SetEMBlackout_20170611_1323_09.log
[2017-06-11T13:23:09.652+00:00] [main] [NOTIFICATION] [ ] [oracle.ruplite] [tid: 1] [ecid:
0000LmNKd0w7Y7Oplgs1yf1PFKGx000001,0] Starting plugin: flo.plugin.SetEMBlackout
[2017-06-11T13:23:09.660+00:00] [flo.plugin.SetEMBlackout] [NOTIFICATION] [ ] [oracle.ruplite] [tid: 1]
[ecid: 0000LmNKd0w7Y7Oplgs1yf1PFKGx000001,0] Sending mail
[2017-06-11T13:23:09.660+00:00] [flo.plugin.SetEMBlackout] [NOTIFICATION] [ ] [oracle.ruplite] [tid: 1]
[ecid: 0000LmNKd0w7Y7Oplgs1yf1PFKGx000001,0] Sending email for 'Done setting EM blackout'
[2017-06-11T13:23:09.660+00:00] [flo.plugin.SetEMBlackout] [NOTIFICATION] [ ] [oracle.ruplite] [tid: 1]
[ecid: 0000LmNKd0w7Y7Oplgs1yf1PFKGx000001,0] System command: echo "EM Blackout has been set
for pod SDIQA38300234-TEST-MC" | mail -s "EM Blackout set for pod SDIQA38300234-TEST-MC"
[2017-06-11T13:23:09.900+00:00] [flo.plugin.SetEMBlackout] [NOTIFICATION] [ ] [oracle.ruplite] [tid: 1]
[ecid: 0000LmNKd0w7Y7Oplgs1yf1PFKGx000001,0] Output:
[2017-06-11T13:23:09.901+00:00] [flo.plugin.SetEMBlackout] [NOTIFICATION] [ ] [oracle.ruplite] [tid: 1]
[ecid: 0000LmNKd0w7Y7Oplgs1yf1PFKGx000001,0] Exit code: 0
[2017-06-11T13:23:09.914+00:00] [main] [NOTIFICATION] [ ] [oracle.ruplite] [tid: 1] [ecid:
0000LmNKd0w7Y7Oplgs1yf1PFKGx000001,0] Successfully completed execution of plugin:
flo.plugin.SetEMBlackout
[2017-06-11T13:23:09.915+00:00] [main] [NOTIFICATION] [ ] [oracle.ruplite] [tid: 1] [ecid:
0000LmNKd0w7Y7Oplgs1yf1PFKGx000001,0] Summary of plugins:
[2017-06-11T13:23:09.916+00:00] [main] [NOTIFICATION] [ ] [oracle.ruplite] [tid: 1] [ecid:
0000LmNKd0w7Y7Oplgs1yf1PFKGx000001,0] Succeeded: flo.plugin.SetEMBlackout
[2017-06-11T13:23:09.916+00:00] [main] [NOTIFICATION] [ ] [oracle.ruplite] [tid: 1] [ecid:
0000LmNKd0w7Y7Oplgs1yf1PFKGx000001,0] Ruplite for Fleet Orchestration
(EM.SET_BLACKOUT_MAIL_DOWN_20170611050000_20170617000000) Completed
```

In some embodiments, this log file retrieval can be completed for a plurality of heterogeneous systems that implement a similar (or the same) change. For example, the change can be a patch to a module of the first heterogeneous system. In some implementations, the patch can include a series of activities performed, such as: pre-down time activities, such as preparatory tasks, system health checks, snipping wiring to up/downstream systems, and the like; activities such as exporting any custom changes that were performed on the software module, for example so that these custom changes can be imported back during later events; and activities such as importing back any customizations, performing basic health checks after patching, and/or restoring connectivity/integration wiring with up/downstream systems. To generate the base signature, log files from systems that implement a similar patch can be retrieved.

In some embodiments, the base signature is generated based on heterogeneous systems with the same or a similar mix of modules or components. For example, log files from hosts of heterogeneous systems can be retrieved that: implement a similar or the same change; and include a similar or the same mix of components. In some embodiments, log files for a heterogeneous system that has patched a similar or the same module repeatedly can be retrieved, for example to retrieve log files that represent the system behavior at each repetition of the patch.

At 404, the logs from the various hosts can be sequenced to generate a signature. For example, for a given heterogeneous system, such as one with similar components and that has implemented a similar change, log files (e.g., over each iteration of the change) can be retrieved and sequenced.

In some embodiments, the retrieved log files can be processed, for example cleansed, sequenced, and tokenized. In distributed computing, heterogenous systems, or other complex systems, log files can be distributed across multiple files in multiple locations. Processing the retrieved log files can include data aggregation/harvesting (e.g., collating logs from various file systems and/or from several parallel processed subsystems to a single location). The logs can then be checked for basic completeness and accuracy (e.g., that they reflect system behavior). The logs can then sequenced and tokenized. In some embodiments, natural language processing techniques can be used to parse and/or process the log files. For example, these techniques can break down the log events into tokens, and these tokens can subsequently be analyzed for irregularities/defects (e.g., errors, warnings, failures, deviations, and the like).

Sequencing log files can include ordering them temporally and/or ordering them functionally. For example, temporal sequencing can involve a timestamp associated with an event/activity that can be used as a key for sequencing. The events/activities can be ordered based on the timestamp. In another example, functional sequencing can involve ordering the logs based on an order of activities/events/sub-events (e.g., based on a predetermined series of activities/events/sub-events).

At 406, a log signature can be generated. For example, a number of processed and sequenced log files can be aggregated to generate a signature that represents that behavior of a heterogeneous enterprise system when a particular change is implemented, such as the patch to a particular module of the heterogeneous enterprise system. For example, events found across multiple systems and multiple log files can be sequenced in a temporal sequence. This can provide an audit trail of the events in the sequence of occurrence. In some embodiments, certain events (e.g., predetermined events that are determined based on individual patches and/or modules/components) can be extracted out from this sequenced event list for base signature generation. At 408, this generated signature can be used as the base signature for the first heterogeneous system when implementing the change.

Figure 5A:
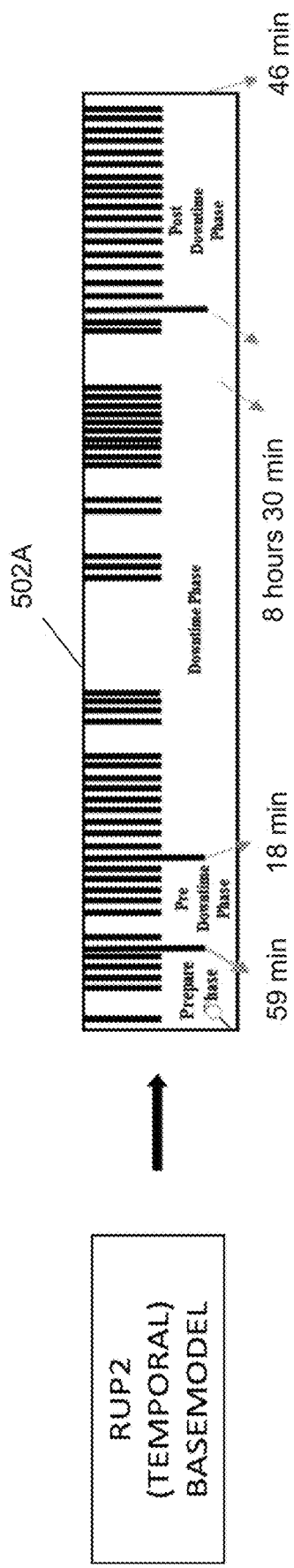
FIGS. 5A and 5B illustrate a temporal base signature and a functional base signature according to an example embodiment.
Figure 5B:
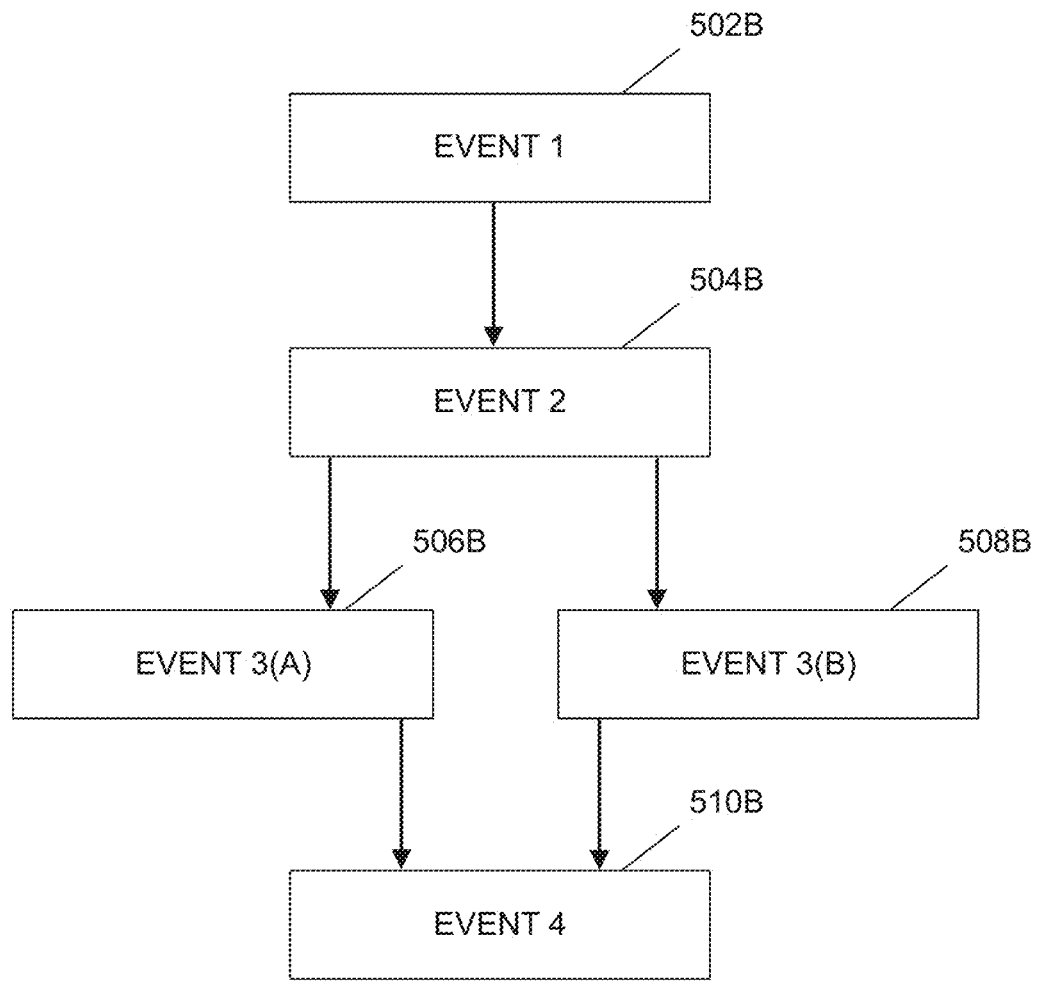

FIGS. 5A and 5B illustrate a temporal base signature and a functional base signature according to an example embodiment. For example, signature 502A illustrates how the temporal log represents a minute by minute depiction of the heterogeneous enterprise system's status while implementing a change. In an embodiment, a change, such as a patch or update, can be broken into a number of phases, such as the pre-phase, pre-downtime, downtime, post-downtime. The temporal signature can depict the time taken by each event within the signature. For example, a business application might follow a certain sequence and the sequence is calibrated on a temporal scale.

FIG. 5B illustrates a functional base signature according to an example embodiment. For example, a change, such as a patch, can include events 502B, 504B, 506B, 608B and 510B. The functional base signature can represent the status of a heterogeneous enterprise system from the perspective of the flow of these events. The functional signature can depict the functional flow of the disparate events. Techniques like clustering can be used to generate the functional signature.

For example, for a known system/environment, the activities/events of a patch will be know prior to implementation. In some implementations, for an unknown system (e.g., a legacy system where minimal documentation exists), techniques like clustering can be used to identify the flow of activities/events and ultimately the functional signature. For example, clustering can group similar events and thus provide an overall understanding of a pattern underlying the activities/events. Once events on a particular host are represented in a mathematical notation/model, correlation techniques can be used to build the integrated functional model.

FIG. 6A illustrates a representation of a base signature according to an example embodiment. In some embodiments, the task sequence, or sequence number 602A, can represent the functional signature, such as the flow of activities/events for the system change (e.g., patch). For example, the flow can be represented by the numeric progression of sequence number 602A. In some embodiments, the time related data, such as the start_time 604A, end_time 606A, and time_taken 608A, can represent the temporal signature.

Embodiments can use the generated base signature to identify irregularities when the relevant heterogeneous enterprise system implements the relevant change. For example, the run time log can be captured from the relevant sources (e.g., hosts). Data processing, cleansing, and noise elimination techniques can be used to clean the runtime log data. The log entries can be sorted by time and duplicate entries can be eliminated. A current temporal signature can be created and it can be transposed with the base signature that has been previously generated. Differences can then be identified as irregularities.

In some cases, an identified irregularity can also be a defect, for example when the log entry lists an error. In some embodiments, irregularities/defects can be identified by the presence of keywords like error, warnings, failure, and the like, which can be present in the temporal or functional signature generated at that point in time. In other cases, where the defect/irregularity is not as explicit, it can be identified by overlaying the base signature on to the signature generated at that point in time.

Figure 7:
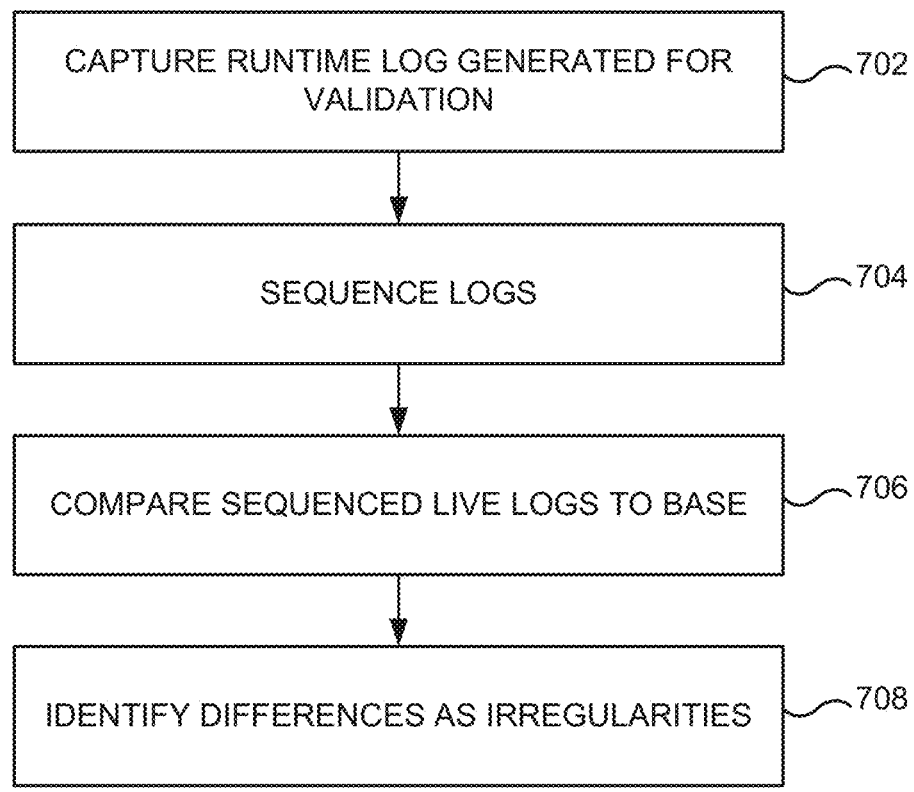
FIG. 7 illustrates a flow diagram for identifying irregularities between a base signature and a current signature according to an example embodiment.

FIG. 7 illustrates a flow diagram for identifying irregularities between a base signature and a current signature according to an example embodiment. At 702, a runtime log can be captured from a heterogeneous enterprise system that is implementing a change. For example, the first heterogeneous system that includes the first mix of modules can be implementing a change, such as patch to one of its modules. While the patch is being implemented (a sample flow of the implementation is demonstrated by the phases illustrated in FIG. 5A), the log files for the hosts of the first heterogeneous enterprise system can be captured.

At 704, these runtime logs can be processed and sequenced. For example, these logs can be processed and sequenced in a manner similar to the base signature (e.g., to generate a temporal signature and functional signature). In some embodiments, the runtime logs that have been processed and sequenced can generate a current signature for the first heterogeneous enterprise system.

At 706, the current signature can be compared to the base signature. For example, the current signature can represent the behavior of the first heterogeneous enterprise system while implementing a first part of the change (e.g., first phase or first few phases of the patch). In other embodiments, the current signature can represent a larger portion (or all) of the change. The current signature can be compared to a corresponding part of the base signature, such as the temporal and/or functional portions of the base signature that correspond to the first phase or first few phases. In some embodiments, the current signature can be overlaid onto the corresponding part of the temporal signature to determine differences.

For example, the comparison between the current signature and the base signature can evaluate deviations in the pattern or sequence of activities/events or differences in the average time taken (for a given activity/event). A difference that meets a criteria (e.g., exceeds a threshold, such as a threshold delta time taken) can be determined to be an irregularity.

At 708, differences between the current signature and the base signature can be identified as irregularities. For example, when the current signature deviates from the base signature, it can be inferred that the first heterogeneous enterprise system has experienced an irregularity when implementing the change (e.g., patch). This irregularity can be a defect, such as an error log, which can be identified based on recognition of a keyword in the logs that make up the current signature (e.g., without the need for comparison with the base signature). In other instances, the irregularity can simply be a log entry that deviates from an expected log entry, which can be identified by the comparison with the base signature.

Figure 6B:
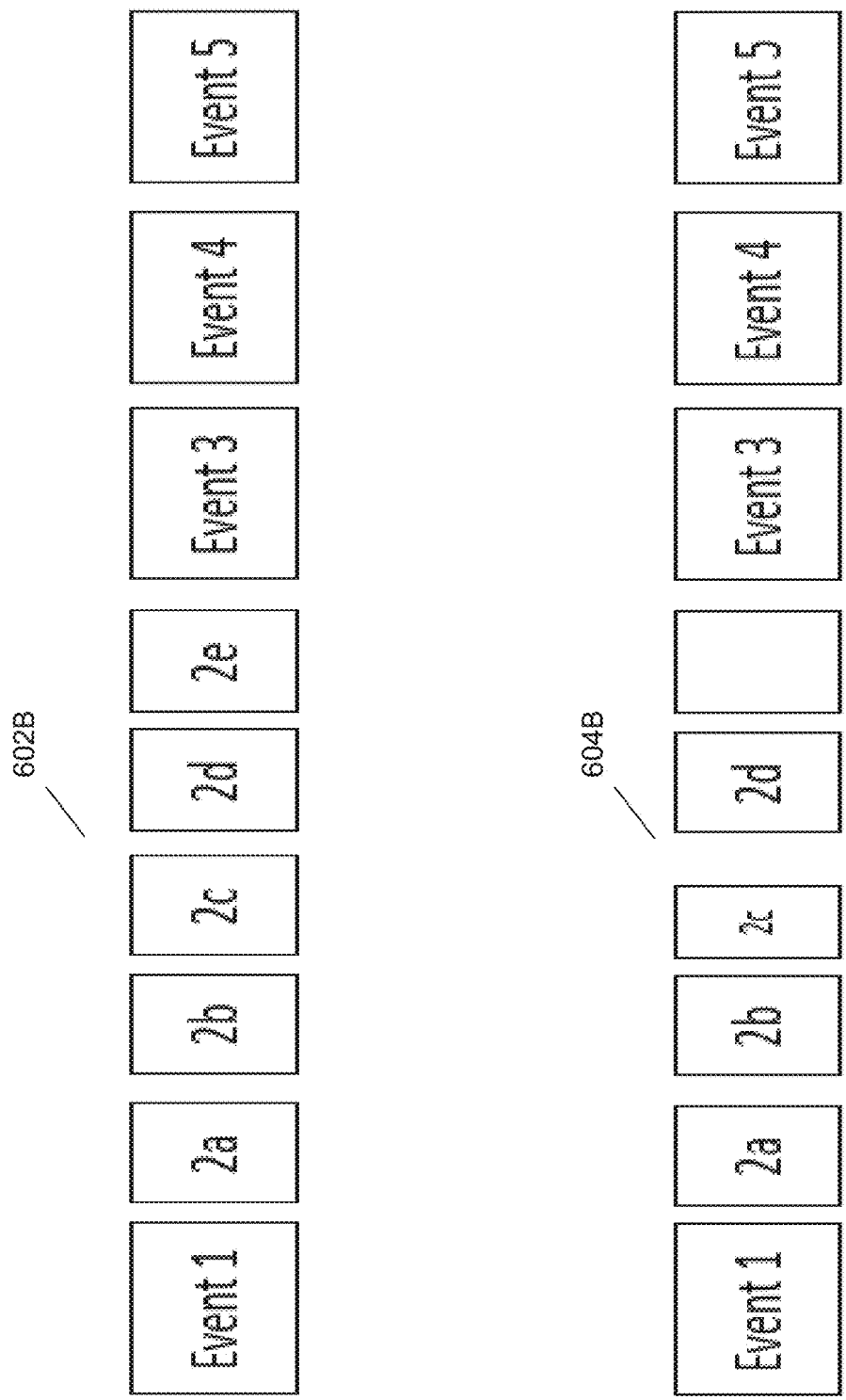

FIG. 6B illustrates representative base signature 602B and representative current signature 604B, which each include events 1, 2, 3, 4, 5. In an example, a comparison between representative base signature 602B and representative current signature 604B shows two potential irregularities: a difference in the time taken for events 2c (illustrated by box size); and missing event 2e from representative current signature 604B. Each of these can represent irregularities (or defects) and, depending on the learning accomplished by a trained machine learning component, one or both of these irregularities/defects can be used to predict downstream defects.

For example, a trained machine learning component can correlate these identified irregularities to predict defects downstream (e.g., further along temporally in the change implementation). From a technology and functional standpoint, many disparate systems can be correlated in a heterogeneous enterprise system. Upstream events can reflect probable downstream implications. Embodiments identify related product activities (e.g., software upgrade vs. software patching activities). The logs for a similar or the same activity can be extracted. Individual events can be identified and any collocated events can be marked. This flow can be repeated for several runs and any correlation can be identified through mathematical modeling or other automated text processors. In some embodiments, defects can include failed updates or changes to sub-systems (e.g., failure to run a script or program to update a piece of software), errors in software interactions (e.g., errors generated by a first software module passing a object, value, or piece of data to a second module in an unexpected manner, such as an incorrect format), failed system health diagnostics, aborted processes, and other suitable failures or errors generated within computing device/server logs.

In some embodiments, model generation can leverage a machine learning component to identify the distance between events that occur during a change implementation (e.g., an upgrade or patching cycle). In an embodiment, a k-nearest neighbor event is determined to find the distance between irregularities/defects on two distant events during a change implementation. For example, the smaller the distance, the more related the irregularity/defects. In other embodiments, a hidden markov model can be implemented to determine these correlations. Embodiments include a machine learning component that is trained using 80% of the training data collected/processed from a particular upgrade wave, where the remaining 20% can be used for validation.

Figure 8:
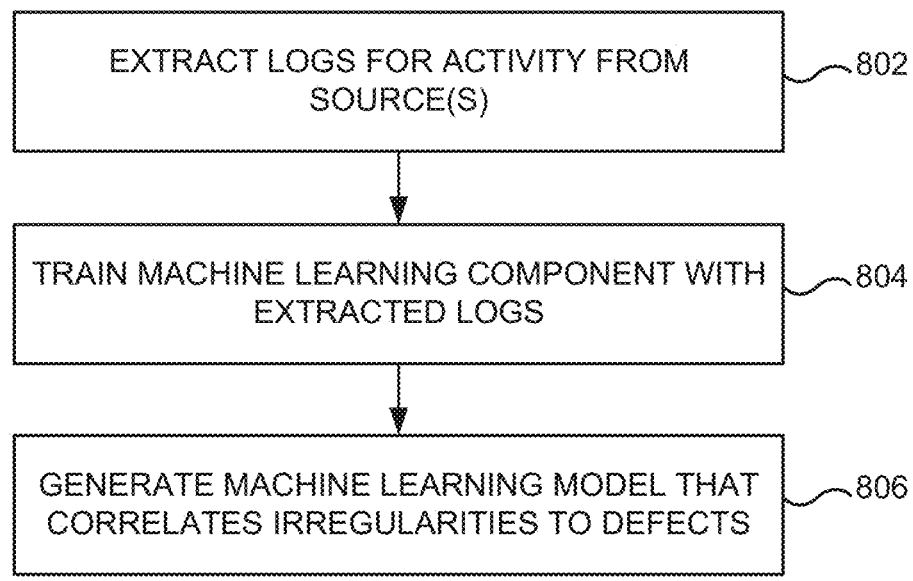
FIG. 8 illustrates a flow diagram for training a machine learning model that predicts defect correlations according to an example embodiment.

FIG. 8 illustrates a flow diagram for training a machine learning component that predicts defect correlations according to an example embodiment. At 802, logs can be extracted for various sources (e.g., hosts) and processed to generate training data. For example, in order to generate the training data, log files can be cleansed, parsed, tokenized, sequenced, and/or otherwise processed, such as in a manner similar to the processing use to generate signatures (e.g., base or current signatures). The resultant processed/tokenized/sequenced logs can be used to train the machine learning component (e.g., used to learn trends in the logs, such as correlations between upstream irregularities/defects and downstream defects).

At 804, the machine learning component can be trained with the training data. For example, the machine learning component can be a k-nearest neighbor model, a hidden markov model, or any other suitable machine learning model. The training data can be used to configure the machine learning component to identify correlations between irregularities (which can include defects) and downstream defects. For example, the correlation can span multiple modules, where an irregularity (or defect) for a first module (shown by the host logs) can be correlated to a defect for a second module (also shown by the host logs).

At 806, the machine learning model that performs the irregularity and defect correlations can be generated. For example, after training, a trained model that receives input and generates defect prediction output can be generated. Embodiments can perform downstream defect prediction using, for example, the base signature for a heterogeneous enterprise system, a dictionary (which contains a source code module to log file mapping), and historic defects per module/sub-system. Based on the irregularity/defect patterns and the inputs, downstream defects can be predicted. For example, if the provisioning of an LCM environment faced certain issues, then it is highly likely that during a patching of the same environment, certain issues might occur (based on historic correlation/trends). Similarly, analysis of the modules that changed and historic production defects can provide further inputs to determine the probability of such a predicted defect materializing.

Within a particular event (e.g., upgrade for a module), an example upgrade flow can be a sequence of 80-100 events. Data for 7000 such updates were collected and analyzed to define embodiments of the prediction model. In some embodiments, a probability matrix is generated to identify the probability that a particular event has repercussion events elsewhere.

Once this is determined, a machine learning component (e.g., k nearest neighbor model, hidden markov model, or the like) can be deployed to determine the distance between such events. In some embodiments, multiple machine learning models can be deployed, and a suitable one can be selected for the given context/domain. During the machine learning building phase and training phase, a plurality of variables (e.g., that impact the downtime for a particular customer) were identified. For example, this list of variables can include type of hardware, processor, memory, network, current software version, data center, the previous upgrade path, the client/customer, the volume of data in the database, the source and target release versions, and the like. For example, variables such as processor, memory, source/target release versions, and/or data center can be used to predict downtime. During testing, embodiments were used to predict downtime over a change implementation (e.g., customer downtime for an LCM event) and an 89-90% accuracy was achieved. Other implementations may achieve different levels of accuracy.

Figure 9:
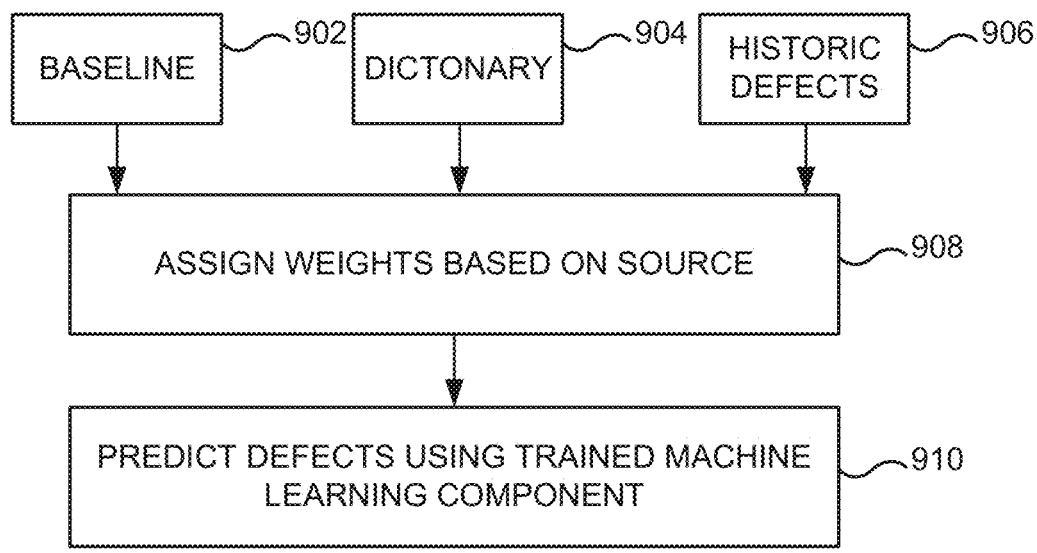
FIG. 9 illustrates a flow diagram for predicting defects that are correlated to identified irregularities according to an example embodiment.

FIG. 9 illustrates a flow diagram for predicting defects that are correlated to identified irregularities according to an example embodiment. At 902, the generated base signature can be provided to the trained machine learning component. At 904, a dictionary can be provided to the trained machine learning component. For example, the dictionary can include a mapping that associates log files with corresponding portions of source code. These associations allow for generated log files to be mapped to functionality/modules/components so that the irregularity/defect correlations can be found.

At 906, historic defects can be provided to the machine learning component. For example, defects that have been discovered in the past can be provided to the machine learning component to configure the component with known instances. These known instances can configure defect identification, for example in processed/tokenized/sequenced logs.

At 908, weights can be assigned based on defects. In some embodiments that include certain implementations (e.g., when using certain machine learning models or in certain heterogeneous systems), the context can involve a probability element in order to perform the prediction. For example, in certain circumstances, the probability that a defect can occur when an anomaly is observed is moderate, but the probability raises if the anomaly is observed when some external factors that are unfavorable are present, such as low memory, high processor utilization, and other factors. In some of these embodiments, a probability matrix can be generated to identify the probability that a particular event (e.g., irregularity/defect) has repercussion events elsewhere. For example, these probabilities can be determined based on the available logs. In some embodiments and implementations, the weights/probability matrix is omitted and prediction can be performed without these values.

At 910, downstream defects can be predicated, for example based on irregularities (or defects) using the trained machine learning component. For example, trends in the training data can configure the machine learning component to predict a defect downstream based on the input provided to the component. In some embodiments, the machine learning component can predict defects to particular modules/components, and/or can predict a number of defects that will be experienced by implementing the change (e.g., patch or update). For example, the trained machine learning component can use the current signature and base signature (e.g., irregularities/defects that can be identified by comparison) to predict downstream defects (e.g., a number of defects) that will be experienced by implementing the change.

In some embodiments, the predicted defects can be used to generate a predicted downtime for a heterogeneous enterprise system that is implementing a change (e.g., patch or update). For example, downtime can be added to a base or default level of downtime based on predicted defects caused by the change to the system (e.g., update or patch implementation). In an embodiment, the predicted downtime can be directly related to the number of defects predicted for the change.

Figure 10:
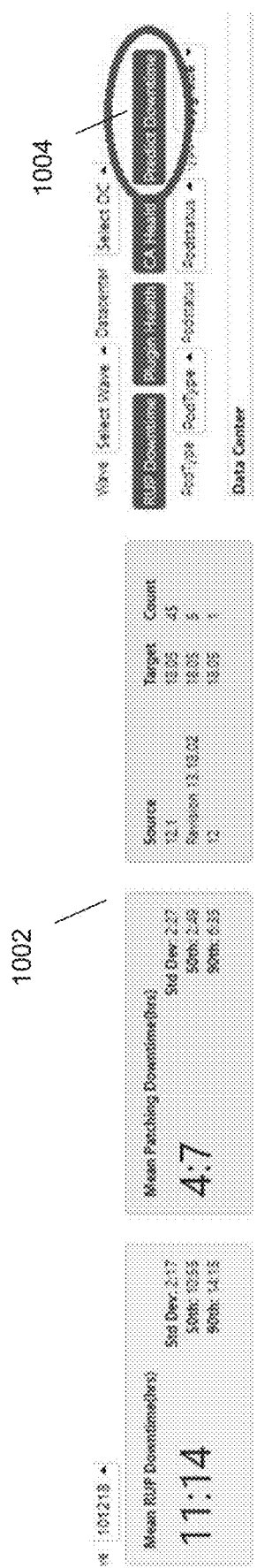
FIGS. 10-11 illustrate user interfaces that display predicted defects for heterogeneous enterprise systems according to an example embodiment.
Figure 11:
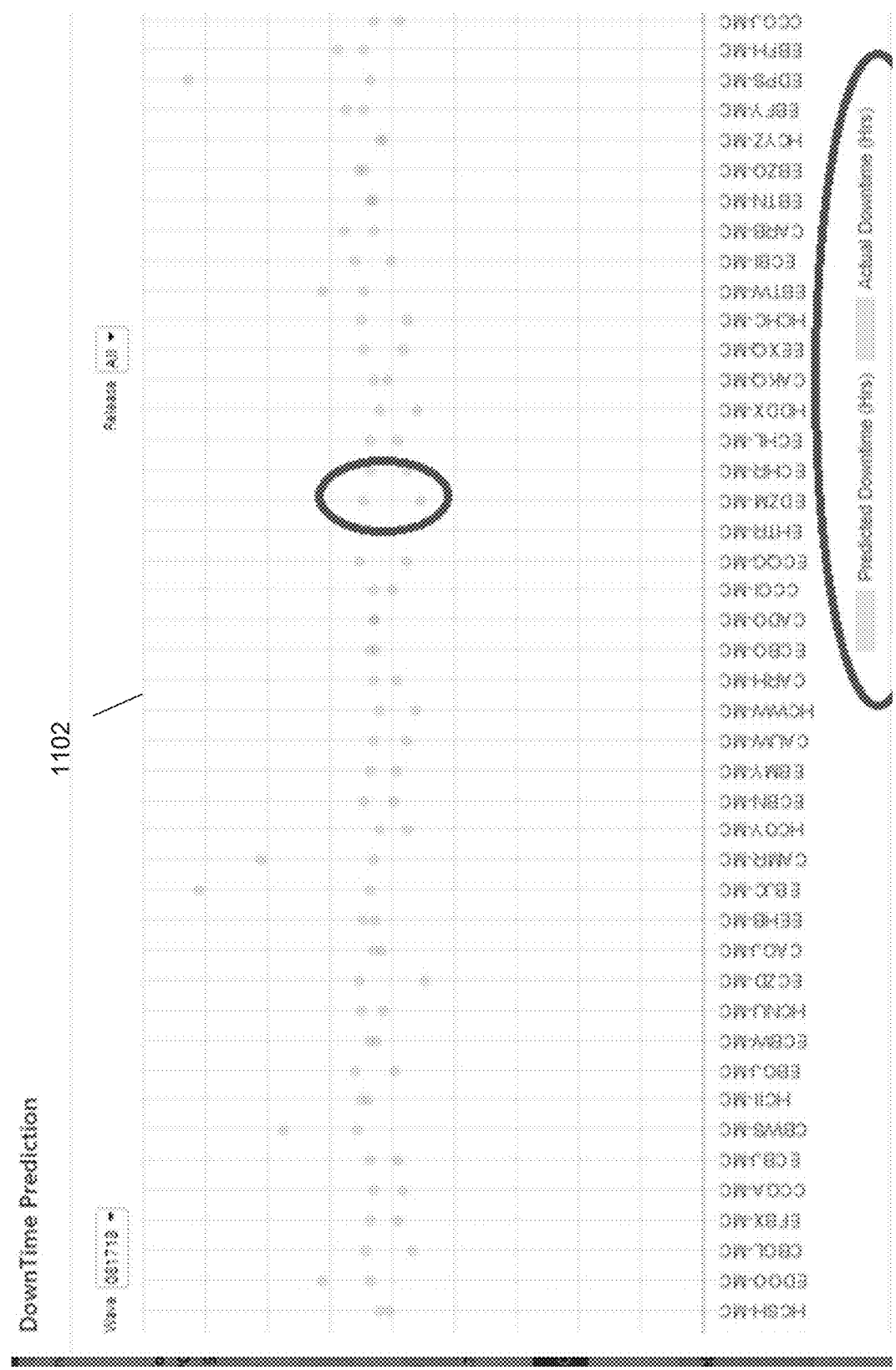

FIGS. 10-11 illustrate user interfaces that display predicted defects for heterogeneous enterprise systems according to an example embodiment. For example, user interface 1002 can include button 1004 for displaying the downtime associated with a change to a heterogeneous enterprise system. User interface 1102 then shows a graph that illustrates the predicted downtime when implementing changes to a heterogeneous enterprise system versus the actual downtime observed when the change was implemented.

Figure 12:
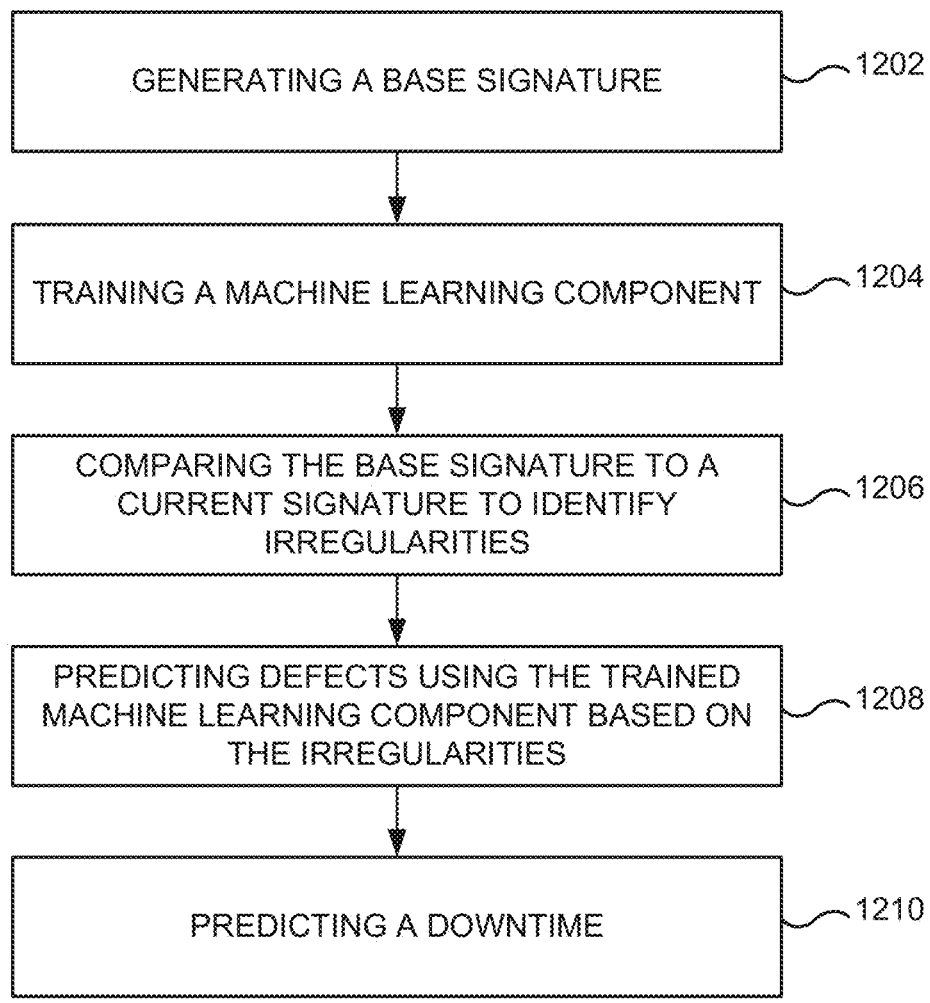
FIG. 12 illustrates a flow diagram for predicting defects by a machine learning component based on a generated signature according to an example embodiment.

FIG. 12 illustrates an example functionality for predicting defects by a machine learning component based on a generated signature according to an example embodiment. At 1202, a machine learning component can be trained with historic data that includes log files which represent a series of events that occurred within a plurality of heterogeneous systems while one or more modules of the heterogeneous systems were being changed (e.g., updated or patched). For example, a plurality of heterogeneous enterprise systems can include different mixes of modules or components, such as cloud service providers, database service providers, application service providers, and the like. In addition, different versions of various software can be used to achieve the enterprise functionality for a given system. Some embodiments include a large number of different heterogeneous enterprise systems, such as tens, hundreds, or thousands.

A service provider can push a change to these heterogeneous enterprise systems, such as pushing a software update or software patch that impacts a number of these different heterogeneous enterprise systems within a period of time (e.g., a week or a weekend). While the update or patch is implemented, the behavior of these systems can be recorded, such as through logs of the processes (e.g., server logs or other computing device logs). For example, an update or patch can include a series of events, and the behavior of the various heterogeneous enterprise systems over these series of events can be represented by a series of logs.

In some embodiments, a machine learning component can be configured to learn trends within these logs. For example, the logs can be synthesized into training data by processing, tokenizing, and sequencing the logs into a temporal and functional signature that represents the temporal series of events and the functional series of events implemented in each heterogeneous system during patching or updating. The machine learning component can then determine correlations within the signatures, such as an initial temporal log entry that tends to cause a later temporal log entry.

In some embodiments, the temporal and functional signatures can be used to train the machine learning component. For example, the machine learning component can be a k nearest neighbor model, a hidden markov model, or any other suitable model.

At 1204, a base signature that represents a series of events that occurred within a subset of the plurality of heterogeneous systems over a plurality of periods of change can be generated. For example, a first heterogeneous system can include a first mix of modules or components. In some embodiments, this first heterogeneous system can be implementing a change, such as an update or patch to one of the modules in the first mix of modules.

In some embodiments, the base signature is based on log files generated by heterogeneous systems with a similar (or the same) mix of modules or components. In some implementations, base signature is also based on log files generated by these heterogeneous systems when they are implementing a similar (or the same) change (e.g., when they are updating the same module, patching the same module, and the like) as the first heterogeneous system is current implementing.

In some embodiments, the base signature can include a temporal signature and a functional signature. For example, the temporal signature can indicate when in time certain logs are generated, and the functional signature can represent a flow of the logs that are generated, or a causality among the generated logs.

At 1206, a base signature for the first heterogeneous system that includes the first mix of modules can be compared to a current signature for the first heterogeneous system to identify one or more irregularities, wherein the base signature represents a series of events that occurred within a subset of the plurality of heterogeneous systems over a plurality of periods of change and the current signature represents a runtime series of events that occur within the first heterogeneous system. For example, when implementing the change, such as the update or patch to a given module of the first heterogeneous system, a current signature can be generated based on the log files being created while implementing the change. The current signature can be compared to the base signature, and one or more irregularities can be identified. For example, the current signature can be overlaid on top on the corresponding portion (e.g., corresponding relative to temporality and functionality) of the base signature to identify irregularities.

At 1208, using the trained machine learning component, one or more defects can be predicted for the first heterogeneous system based on the identified irregularity. In some embodiments, the predicting includes correlating an identified irregularity for a first module among the first mix of modules to a defect for a second module among the first mix of modules. For example, the machine learning component that has been trained with historic signature data (e.g., log data from heterogeneous enterprise systems that are implementing a change, such as a patch or update) can be used to predict one or more defects that are correlated with the irregularity. In an embodiment, the irregularity can be associated with a first module of the first heterogeneous system, and the defect (e.g., that is correlated with the irregularity) can be associated with a second module of the first heterogeneous system.

At 1210, generating, using the predicted defects, a downtime prediction for the first heterogeneous system while one or more of the first mix of modules is upgraded or patched. For example, downtime can be added to a base or default level of downtime based on predicted defects caused by the change to the system (e.g., update or patch implementation). In an embodiment, the predicted downtime can be directly related to the number of defects predicted for the change.

Embodiments predict defects using a machine learning component based on a generated signature. A heterogeneous system can be a computing system with a plurality of different modules or components working together, such as an enterprise software system that leverages different types of cloud services, application services, database services, and the like. In such an environment, changes to one module or component can impact other parts of the system. For example, when a module or component of the system is updated or patched, the remaining system modules or components can be affected since the different parts of the heterogeneous system work together to achieve the enterprise functionality.

In some embodiments, a service provider, such as a cloud service provider, database service producer, or other software as a service provider, can implement mitigation techniques to predict the impact that a change can have on a heterogeneous system. For example, when the service provider pushes a patch or update, the service provider can often impact several clients, such as hundreds or thousands, at any given time. These customers can have a variety of different configurations that implement their enterprise systems, such as different software service providers, versions of service/software, hardware, and the like. Embodiments implement various techniques to predict defects within configurations of heterogeneous enterprise systems when a change is made to a module or component of the system, such as when an update or patch is pushed.

In some embodiments, a base signature can be generated based on changes made to a module of a given enterprise software system over time. For example, for a given configuration of an enterprise system, a first module may be updated or patched several times, and the impact of these updates or patches can be used to generate a base signature that represents how the system behaves when the first module is updated or patched. In some embodiments, log files are processed and sequenced to generate the base signature.

Once the base signature is generated, it can be compared to the system behavior during subsequent changes, such as subsequent updates or patches. For example, when a patch or update begins, the log files that represent the system behavior can be used to generate a current signature. Similar to the base signature, the log files can be processed and sequenced to generate the current signature. The current signature can be compared to a corresponding part of the base signature to determine if system behavior matches the past. For example, natural language processing techniques can be used to identify discrepancies. When the comparison yields deviations, irregularities can be identified.

In some embodiments, a trained machine learning component can correlate these irregularities to predict defects downstream. For example, a machine learning component can be trained with the heterogeneous system behavior over past patches or updates (e.g., the processed and sequenced log files). The trained machine learning component can then identify patterns where an irregularity generates a defect downstream. For example, the historic data can show that in some configurations of heterogeneous enterprise systems, a first irregularity caused by patching or updating a first module can generate a first defect in a second module, while in other configuration of heterogeneous enterprise systems the first irregularity caused by updating or patching the first module can generate a second defect in a third module.

Thus, the irregularities can be correlated to predict defects that are specific to the configuration of the heterogeneous enterprise systems. Embodiments can also use the predicted defects to predict a downtime for a heterogeneous enterprise system while the change is being implemented, such as downtime for the system while a module is being patched or updated.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for predicting defects using a machine learning component based on a generated signature, the method comprising:
    receiving a trained machine learning component that has been trained with historic data that represents a series of events that occurred within a plurality of heterogeneous systems over a plurality of periods of change for the heterogeneous systems, wherein the heterogeneous systems comprise different mixes of modules;
    comparing a base signature for a first heterogeneous system that comprises a first mix of modules to a current signature for the first heterogeneous system to identify irregularities, wherein the base signature represents a baseline series of events that occurred within one or more the plurality of heterogeneous systems over one or more periods of change, the current signature represents a runtime series of events that occur within the first heterogeneous system, and at least one irregularity is identified when an event from the base signature is missing from the current signature or a time duration for an event of the base signature is different from a time duration for a corresponding event of the current signature; and
    predicting, using the trained machine learning component, one or more defects for the first heterogeneous system based on the identified one or more irregularities.

2. The method of claim 1, wherein the base signature comprises a base temporal signature that represents a timing for the baseline series of events and a base functional signature that represents an ordered sequence for the baseline series of events.

3. The method of claim 2, wherein the current signature comprises a current temporal signature that represents a timing for the runtime series of events and a current functional signature that represents an ordered sequence for the runtime series of events.

4. The method of claim 1, wherein a plurality of logs files are sequenced to generate the base signature.

5. The method of claim 1, wherein the series of events that occurred within the plurality of heterogeneous systems over the plurality of periods of change comprise steps for a patch or upgrade of at least one module of the plurality of heterogeneous systems, and the current signature represents a runtime series of events that occur within the first heterogeneous system while one or more of the first mix of modules is upgraded or patched.

6. The method of claim 5, wherein the predicting comprises correlating an identified irregularity for a first module among the first mix of modules to a defect for a second module among the first mix of modules, and the defect for the second module is downstream from the irregularity for the first module.

7. The method of claim 6, wherein the trained machine learning component comprises a nearest neighbor component or a hidden markov model.

8. The method of claim 6, further comprising:
    training the machine learning component with historic training data that comprise log files which represent a series of events that occurred within the plurality of heterogeneous systems while one or more modules of the heterogeneous systems were being updated or patched.

9. The method of claim 8, further comprising:
    generating, using the predicted defects, a downtime prediction for the first heterogeneous system while one or more of the first mix of modules is upgraded or patched.

10. The method of claim 8, where at least a portion of the one or more identified irregularities comprise defects.

11. A system for predicting defects using a machine learning component based on a generated signature, the system comprising:
    a processor and memory, wherein the processor is configured to:
        receive a trained machine learning component that has been trained with historic data that represents a series of events that occurred within a plurality of heterogeneous systems over a plurality of periods of change for the heterogeneous systems, wherein the heterogeneous systems comprise different mixes of modules;
        compare a base signature for a first heterogeneous system that comprises a first mix of modules to a current signature for the first heterogeneous system to identify irregularities, wherein the base signature represents a baseline series of events that occurred within one or more of the plurality of heterogeneous systems over one or more periods of change, the current signature represents a runtime series of events that occur within the first heterogeneous system, and at least one irregularity is identified when an event from the base signature is missing from the current signature or a time duration for an event of the base signature is different from a time duration for a corresponding event of the current signature; and predict, using the trained machine learning component, one or more defects for the first heterogeneous system based on the identified one or more irregularities.

12. The system of claim 11, wherein the base signature comprises a base temporal signature that represents a timing for the baseline series of events and a base functional signature that represents an ordered sequence for the baseline series of events.

13. The system of claim 11, wherein a plurality of logs files are sequenced to generate the base signature.

14. The system of claim 11, wherein the series of events that occurred within the plurality of heterogeneous systems over the plurality of periods of change comprise steps for a patch or upgrade of at least one module of the plurality of heterogeneous systems, and the current signature represents a runtime series of events that occur within the first heterogeneous system while one or more of the first mix of modules is upgraded or patched.

15. The system of claim 14, wherein the predicting comprises correlating an identified irregularity for a first module among the first mix of modules to a defect for a second module among the first mix of modules.

16. The system of claim 15, wherein the trained machine learning component comprises a nearest neighbor component or a hidden markov model.

17. The system of claim 16, wherein the processor is further configured to:
generate, using the predicted defects, a downtime prediction for the first heterogeneous system while one or more of the first mix of modules is upgraded or patched.

18. A non-transitory computer-readable medium having instructions stored thereon that, when executed by a processor, cause the processor to predict defects using a machine learning component based on a generated signature, the instructions causing the processor to:

receive a trained machine learning component that has been trained with historic data that represents a series of events that occurred within a plurality of heterogeneous systems over a plurality of periods of change for the heterogeneous systems, wherein the heterogeneous systems comprise different mixes of modules;

compare a base signature for a first heterogeneous system that comprises a first mix of modules to a current signature for the first heterogeneous system to identify irregularities, wherein the base signature represents a baseline series of events that occurred within one or more of the plurality of heterogeneous systems over one or more periods of change, the current signature represents a runtime series of events that occur within the first heterogeneous system, and at least one irregularity is identified when an event from the base signature is missing from the current signature or a time duration for an event of the base signature is different from a time duration for a corresponding event of the current signature; and predict, using the trained machine learning component, one or more defects for the first heterogeneous system based on the identified one or more irregularities.

19. The method of claim 3, wherein the at least one irregularity is identified when it is determined that an event is missing from the ordered sequence for the runtime series of events when compared to the ordered sequence for the baseline series of events.

20. The method of claim 3, wherein the at least one irregularity is identified when a first time duration for an event represented in the current temporal signature is different from a second time duration for a corresponding event in the base temporal signature and the difference between the first time duration and the second time duration meets a criteria.

* * * * *